INVENTORS
JAMES W. HUFF
WALLACE H. WOODROW
JOHN F. CAMPBELL
BY Reuben Wolk
THEIR ATTORNEY June 8, 1965 J. W. HUFF ETAL 3,188,254
METHOD AND APPARATUS FOR MAKING ENDLESS BELT BODIES
Filed Aug. 4, 1959 5 Sheets-Sheet 3

INVENTORS
JAMES W. HUFF
WALLACE H. WOODROW
JOHN F. CAMPBELL

BY Reuben Wolk

THEIR ATTORNEY

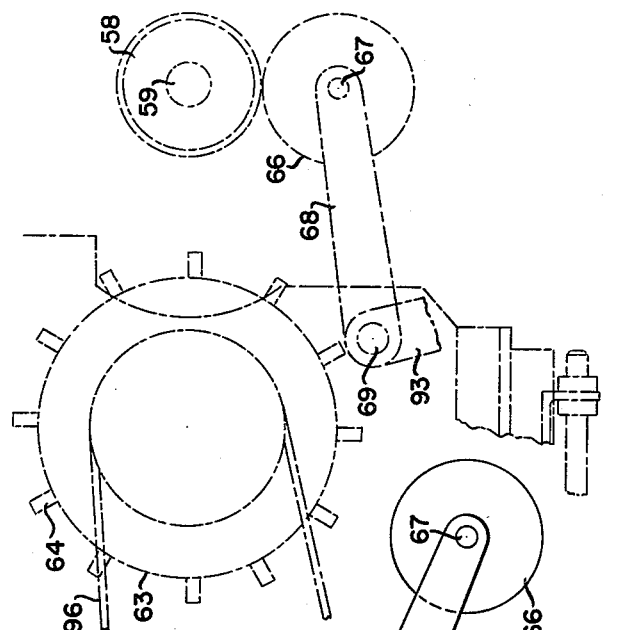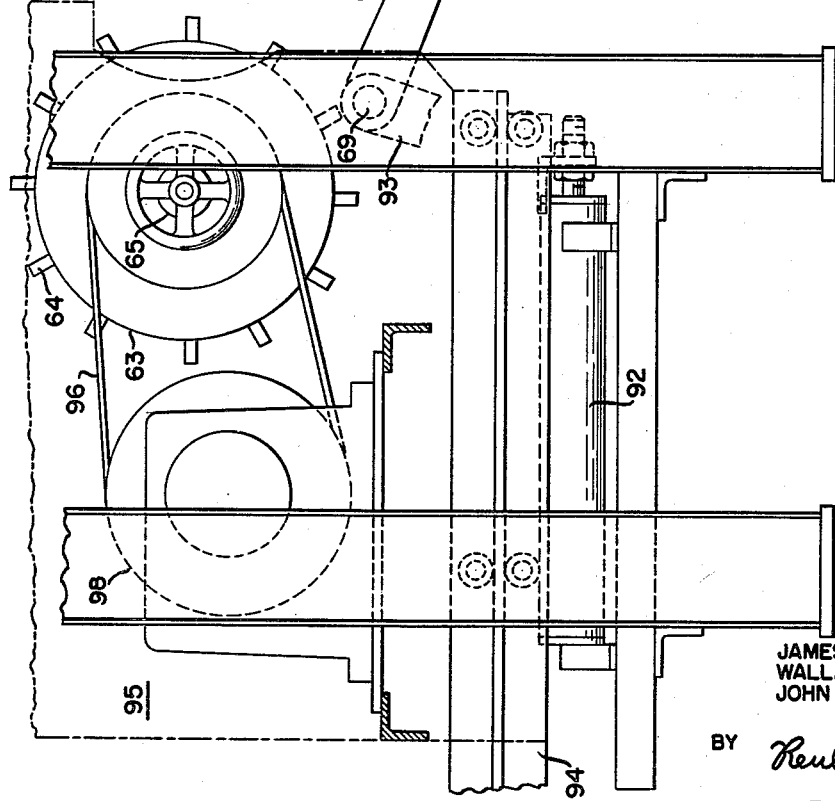

INVENTORS
JAMES W. HUFF
WALLACE H. WOODROW
JOHN F. CAMPBELL

BY Reuben Wolk

THEIR ATTORNEY

United States Patent Office 3,188,254
Patented June 8, 1965

3,188,254
METHOD AND APPARATUS FOR MAKING
ENDLESS BELT BODIES
James W. Huff and Wallace H. Woodrow, Dayton, and
John F. Campbell, Cuyahoga Falls, Ohio, assignors to
Dayco Corporation, a corporation of Ohio
Filed Aug. 4, 1959, Ser. No. 831,677
3 Claims. (Cl. 156—137)

This invention relates to an apparatus for manufacturing endless reinforced belts, and to the method employed in such manufacture. More, particularly, the belts referred to are V-belts of the type which are made of rubber materials and reinforced by cords, formed from belt bodies manufactured by the novel apparatus.

Belts of the type contemplated herein are conventionally made by forming a layer of rubber on a cylindrical member, wrapping a reinforcement, such as cord, around the layer, and placing an additional rubber layer about the cord to provide a sleeve which is then cut apart to provide a number of completed belt bodies that are later formed into finished belts by molding. These steps are usually accomplished by a series of unrelated processes which provide the finished product.

The present invention offers for the first time a method of accomplishing the hitherto unrelated steps by the use of a single machine which is simple to operate and provides high quality, consistent products. It has been found that two such machines can be operated by a single operator whereas in the operation of separate mechanisms it is necessary to utilize the services of at least four operators to perform the same amount of work. It is thus obvious that the novel machine, by grouping all functions for the first time in the industry, is highly important in saving of manpower, hence costs.

It is a primary object of this invention to provide a single apparatus for manufacturing endless V-belt bodies.

It is a further object to provide an economical and simple method of producing belt bodies by means of such an apparatus.

Another object is the control of the factors necessary to produce belt bodies of all sizes and types.

A further object is the use of automatic features to produce belt bodies on the novel apparatus.

Other objects of the invention will be apparent from the following description. Generally speaking, it may be said that the novel apparatus is capable of performing the following steps with a minimum of manual operations:

(1) Automatically feeding and cutting a compression section to the desired length, and splicing it to provide the desired annular member.

(2) Placing this section on a radially and axially adjustable building member which is designed to accommodate a wide range of sizes.

(3) Spinning the strength cords from a portion of the mechanism directly onto the compression section with full control of speed and spacing, and including provisions for automatic stopping.

(4) Feeding the stock for the tension section from another portion of the mechanism and applying it over the cord, then cutting the stock to size and applying necessary pressure to bond the entire belt sleeve.

(5) Bonding all members temporarily.

(6) Automatically cutting the belt sleeve into individual belt bodies with full control of width.

Further details of the invention will be brought out in the following specification and drawings, in which:

FIGURE 4 is a side elevational view of another portion of the mechanism shown in two positions.

*Description of the apparatus*

Figure 1:
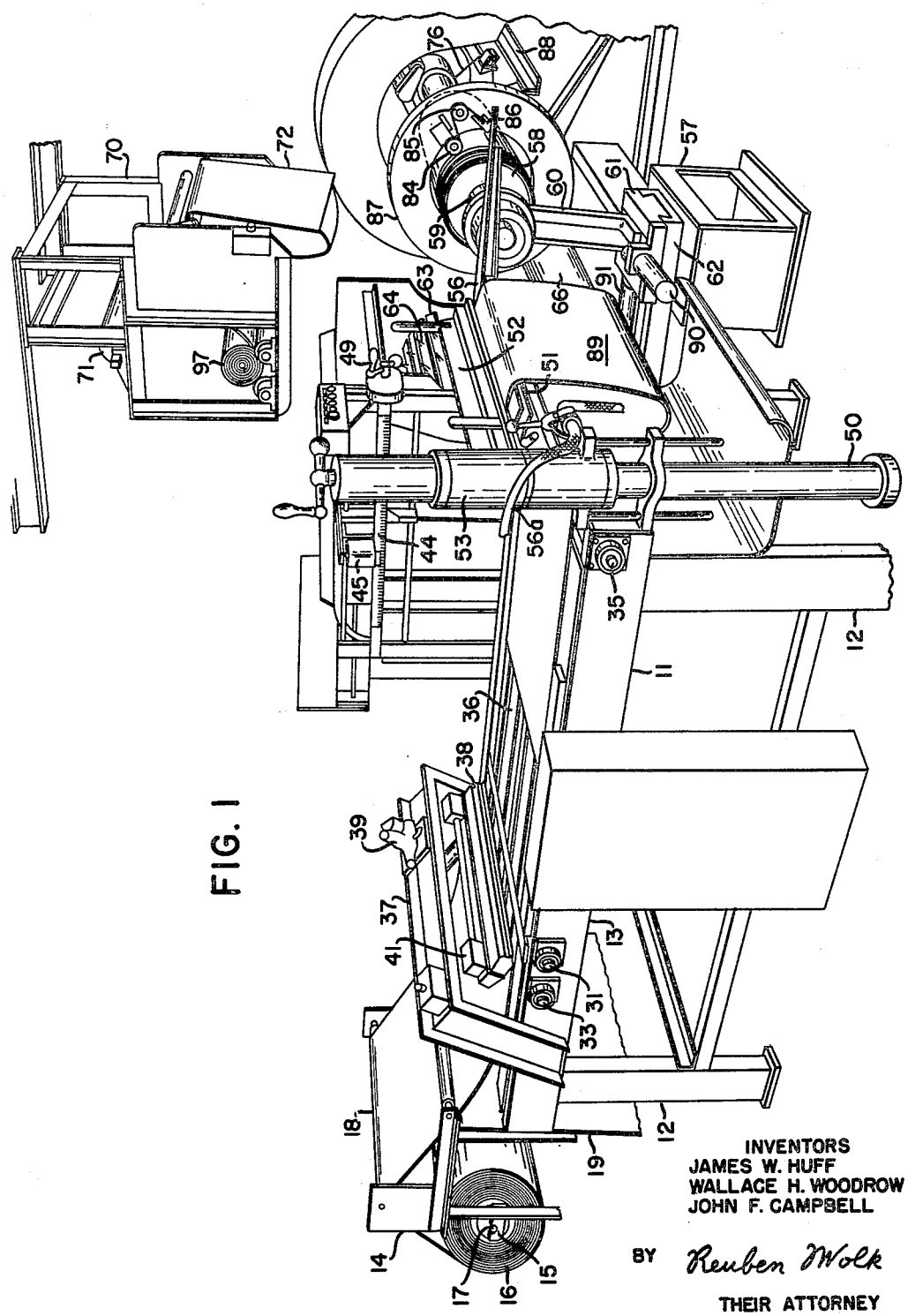
FIGURE 1 is a perspective view of the complete belt body building mechanism.
Figure 2:
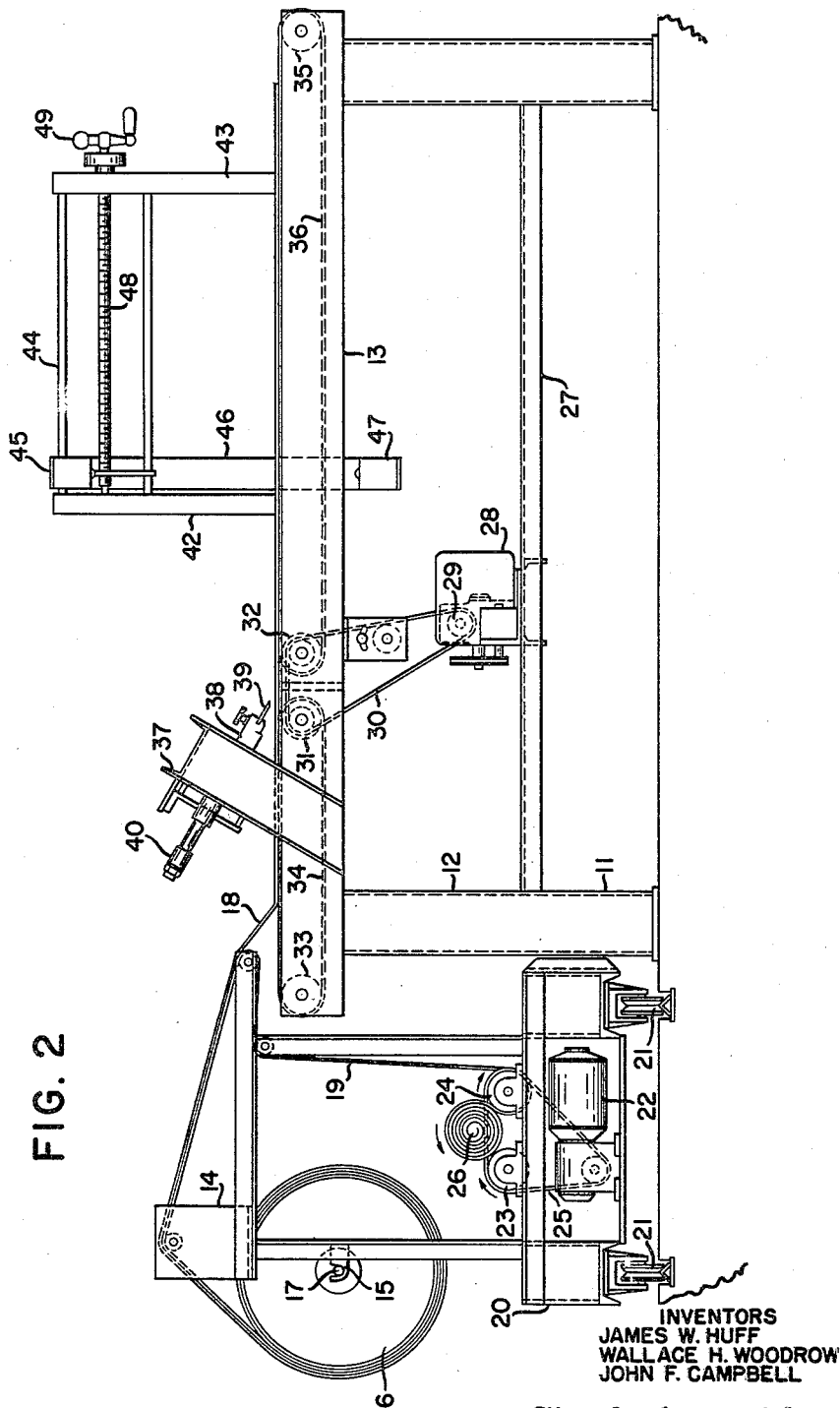
FIGURE 2 is a side elevational view of a portion of the mechanism.

The apparatus comprises several basic structural members which act as supports for the various parts of the mechanism. As illustrated in FIGURES 1 and 2, reference numeral 11 refers to a structural member of frame which is used for forming the inner or compression section of the belt bodies. This frame consists of four legs or posts 12 which support a pair of upper side members 13 serving to support mechanism for feeding, measuring, cutting and conveying the material which is used for the compression section. Beyond the left-hand end of the frame 11, as seen in FIGURE 2, is a group of structural members 14 on which are mounted supporting brackets 15 in which a supply or feed roll 16 is supported by means of shaft 17. The feed roll contains the compression stock 18 comprising a thin sheet of uncured rubber which is rolled upon the supply roll alternately with a canvas or other fabric roll 19 that is used to prevent the compression stock from sticking to itself. The members 14 and supply roll 16 are mounted on a carriage 20 which is preferably capable of movement upon the wheels 21 as shown in FIGURE 2. Also mounted on this carriage 20 is a driving motor 22 and a pair of rollers 23 and 24 interconnected to the driving motor by a belt 25. The fabric separator member 19 passes over the roller 24 and onto a take-up roll 26 which rests upon the rollers 23 and 24 and is rotated thereby.

The frame 11 also contains a cross-member 27 which is below and parallel to the members 13. On this member 27 is mounted a motor 28 and upon this motor is mounted a pully 29 driving a belt 30 which also passes over a pair of rollers 31 and 32 mounted between the members 13. Another roller 33 is also mounted between the members 13 at the left-hand end thereof, and a series of narrow conveyor belts 34 are passed over the rollers 31 and 33. At the right-hand end of the member 13 is also mounted another roller 35 and another series of narrow conveyor belts 36 passes over the rollers 32 and 35 in a similar fashion to the belts 34.

At the left-hand end of the frame 11 is mounted a structural support 37 at an angle to the table surface. This support carries the cutting knife assembly 38 which is mounted so that the knife blade 39 is capable of travel at an angle of 45 degrees to the plane of the conveyor belts 34 and 36. Actuation of the kinfe blade is provided by means of an air of hydraulic piston 40 which is connected to a source of power (not shown). Also mounted upon the structural support 37 is a conventional heating element 41 which is preferably electrical in nature and connected to the power system used for the remainder of the apparatus. This heating system permits the knife blade to be heated during the cutting step.

Also mounted on one of the members 13 are the supports 42 and 43 in the center and right-hand end of the structure, respectively. Extending between these supports is a cross member 44 which provides a support for a photoelectric cell system, comprising a light source 45, a vertical member 46 attached to the light source, and the receiving cell 47 which is mounted on the member 46 and located below the members 13. This system thus provides an indicating means or signalling device relating to the cutting knife, as described below. The cross member 44 is provided with a numerical indexing system as shown in FIGURE 1 to provide prearranged positioning of the photoelectric system. Parallel to the cross member 44 is a threaded shaft 48 which is also interconnected to the member 46 to permit it to travel thereon. At the right-hand end of the shaft is affixed a handle 49 to permit the shaft to be rotated and thus to cause the member 46, together with light source 45 and cell 47 to move to left or right, as more fully described below. Mounted on the right-hand side of the frame 11 is a post 50 to which is rigidly mounted a platen 51 that is upwardly convex. Above this platen an arm 52 is pivotally mounted by means of a collar 53 which is thus free to rotate about the post. This arm includes an inflatable air bag 54, capable of expansion and retraction by means of the air chamber 55 which is supplied from an outside air source through air hose 56a. Mounted on the lower surfaces of the platen 51 are several conduits 54a through which vacuum pressure is applied. The vacuum is then applied to the platen surface through apertures 55a to assist in holding down the compression section 89. The relationship between platen 51 and the arm 52 and its components is more clearly shown in FIGURE 6, and the operation of this device will be further explained below. On the free end of the platen 51 is also mounted a tapered arm 56 which is capable of rotation throughout 90 degrees with respect to the end by which it is mounted to the platen. The function of this operation will also be described below.

Located adjacent the frame 11 is another structural framework 57 to which is mounted the remaining mechanism. The principal part of this mechanism consists of the expandable building drum 58 upon which the belt is to be assembled and is mounted on a shaft 59 which is interconnected to the main drive system of the mechanism. The details of the drum are not shown but the outer surface thereof consists of a number of longitudinal segments which are capable of expansion and constraction by methods which are well known in the art, thus providing a range of diameters thereto. Mounted adjacent the free end of the drum and shaft is a tailstock member 60 which is adapted to be moved into and away from support for the free end of the shaft as well as into and out of alignment therewith. This accomplished by mounting the tailstock on a track 61 which in turn is mounted in a grooved track 62 that extends at right angles to the shaft 59. This permits the entire tailstock and track 61 to be actuated back and forth in track 62 by means of an air or hydraulic piston 91 so that it is in its furthermost position as shown in FIGURE 1 which is in alignment with the shaft, or it may be run to the left leaving the end of the shaft clear. The tailstock is also free to slide in track 61 toward and away from the end of the shaft by means of a similar piston 90; in FIGURE 1 the tailstock is shown in support of the end of shaft 59.

Figure 5:
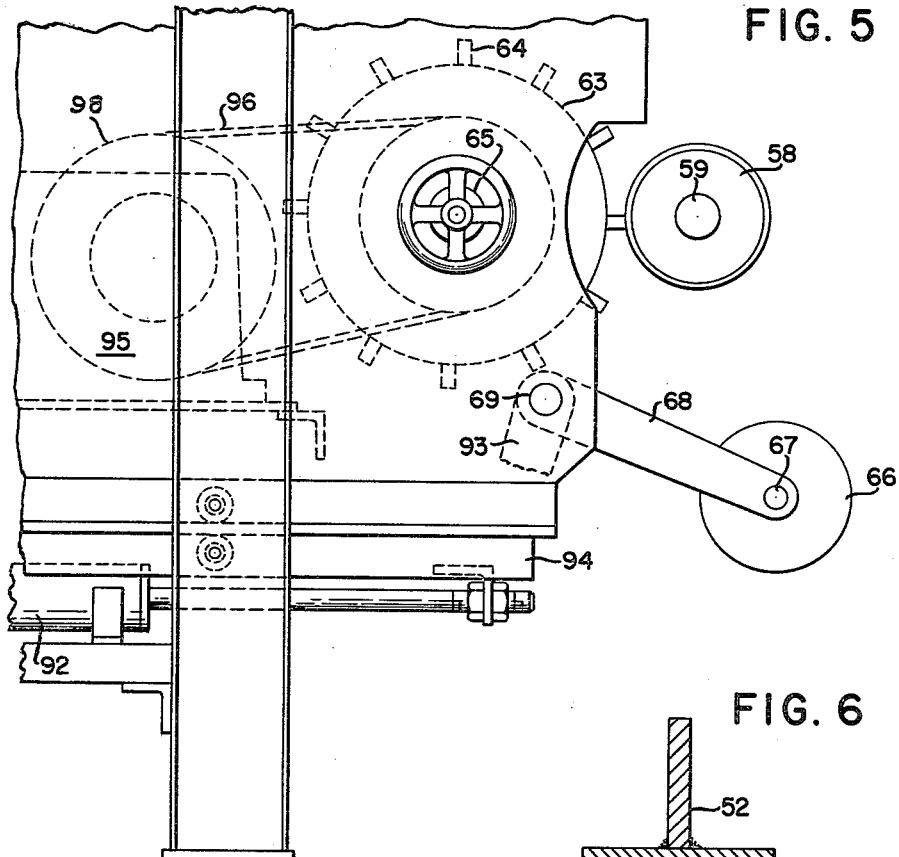
FIGURE 5 is a view similar to FIGURE 4 showing the mechanism in a different position.

Behind the drum 58 and structural member 57 is another structural member 95 which is best shown in FIGURES 4 and 5. Mounted on the member 95 is a cutting cylinder 63 having a number of cutting knives 64 placed at staggered intervals along the surface in both radial and peripheral directions. The cutting cylinder is mounted on a rotatable shaft 65 which is mounted to the structural member 95. Adjacent to the cutting cylinder and also mounted on the member 95 is a driving motor 98, which is operatively connected to the cutting cylinder by means of a driving belt 96, thus providing a rotation for the cutting cylinder. At the same time, the entire member 95, the cylinder 63, shaft 65, and motor 98 are capable of movement from the left-hand position of FIGURE 4 to the right-hand position of FIGURE 5 by virtue of a slidable mounting of member 95 upon cross-member 94 which is a part of the principal structure 57.

The actual movement is accomplished by the air or hydraulic piston 92 which is also mounted on member 94 and operatively connected to member 95. It should be noted that the details of the cutting cylinder are not disclosed herein because it is the subject of a separate application, but it suffices to say that rotation of the drum in the position shown in FIGURE 5 provides the desired cut which will be later described.

Also mounted on the structural member 95 is a rocker shaft 69, to which is connected a rocker arm 93 capable of actuation by conventional means (not shown). Also connected to the shaft 69 is a pair of arms 68 which rock with the shaft, and between which are mounted a shaft 67. A pressure roller 66 is rotatably mounted on shaft 67. The roller 66 and arms 68 are capable of motion from the position shown in full lines in FIGURE 4, to the position shown by broken lines in FIGURE 4 in which the roller presses against the periphery of the drum 58. The exact function of this member will be described below.

Mounted above the building and cutting drums is a supply rack 70 which contains a supply roll 71 carrying a thin sheet of uncured rubber 72 which forms the tension section of the belt body. Alternating with the rubber material is a roll of canvas 97 which serves to keep the material from sticking to itself as previously described with respect to compression material 18. The roll 71 is rotatable upon actuation by an operator so that tension can be removed, while the canvas is rolled up spearately as shown in FIGURE 1.

Figure 3:
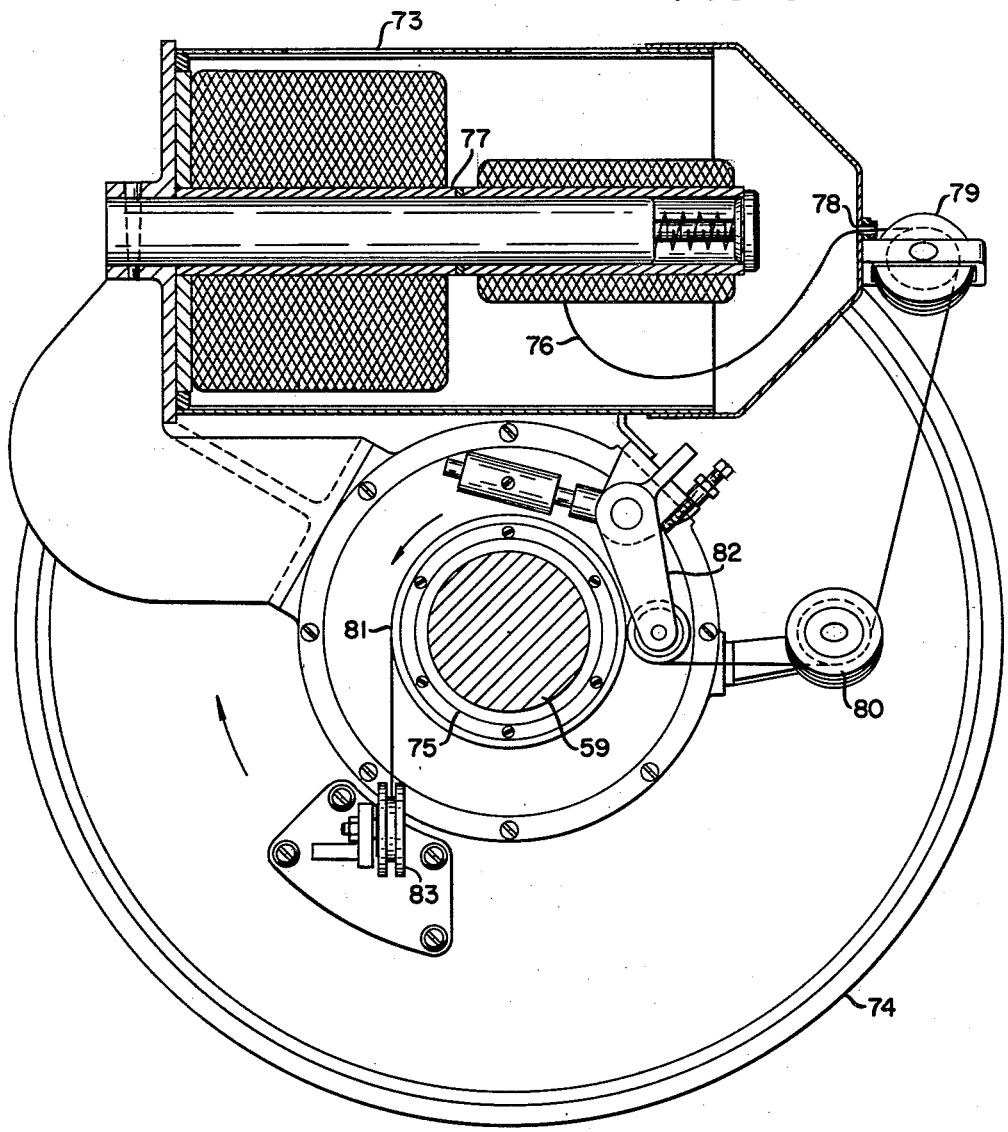
FIGURE 3 is a view partially in section illustrating the further details of a portion of the mechanism.

The mechanism for supplying the strength cord 76 is best shown in FIGURE 3, and includes a reservoir or container 73 which is mounted on a collar 74 which is mounted on a bearing 75 that is rotatably mounted on shaft 59. The container thus rotates with the collar. A roll of the cord 76 is mounted within the container on a spool 77, and the cord is then fed through an aperture 78 in the reservoir onto a pulley 79 which is mounted on the reservoir, then onto a second pulley 80 which is mounted on the collar 74. The cord then passes around a smaller collar 81 which is mounted on the bearing 75, and is held against the collar 81 by means of a tension brake 82 which provides the necessary tension to the cord and these prevent it from being pulled from the spool too fast. The cord is then passed over pulley 83 mounted on collar 74 then passed parallel to the drum, through the collar 87 which is also rotatably mounted on shaft 59, and through the pulleys 84, 85 and 86 which are mounted on the left-hand face of the collar 87. The cord is then free to be placed directly on the annular compression member 89 which is mounted on the drum as described below. The collar 87, in addition to being capable of rotation, is free to move axially parallel to the drum upon shafts 88, and is driven by a conventional means such as a threaded driving shaft. The rotation of both collars 74 and 87 is accomplished by conventional means such as pulleys and belting independently of the shaft 59, but this driving means is not a part of the invention and is not shown.

*Operation of the apparatus*

The manufacture of belts involves first, the formation of a belt sleeve which consists of an annular member having an inner compression section, a layer of strength cords and an outer tension section. When using the novel apparatus described herein, the operator's first step is to feed compression stock 18 from the supply roll 16 by operating a switch which actuates the motor 28, and thus driving the conveyor belts 34 and 36. These belts will then cause the stock 18 to be brought forth toward the cutting knife assembly 38 and at the same time the motor 22 will act to reel up the fabric separating stock 19 onto the roll 26. As soon as the end of the compression stock has been passed under the photoelectric cell, the interrupted beam of light between members 45 and and 47 provides a signal which is automatically transmitted from the cell to the piston 40 to actuate the knife assembly and drive the knife at a 45 degree angle with the table. The knife blade 39 which is heated by means of electric heater 41 will cut through the compression stock, thus providing a skived 45 degree surface so that the ends may be spliced. At the same time a signal is transmitted to the motors 28 and 22 in order that the feed of the compression stock may stop. The operator may pre-select the length of the compression material that he desires in accordance with the ultimate finished belt diameter by means of the indexing system on cross member 44 and the handle 49 which enables him to establish the position of the photoelectric system and therefore the time during which the cutting operation occurs.

Figure 6:
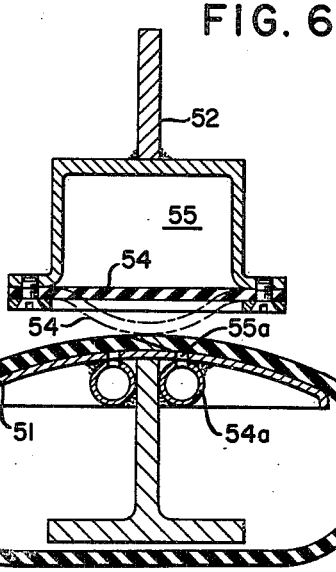
FIGURE 6 is a sectional view of another portion of the mechanism.

The operator then pulls the cut compression section toward him and wraps it around the platen so that the skived edges are in contact as shown in FIGURE 6. He is assisted in holding this in position by means of a vacuum which is applied through apertures 55a in the platen. He then swings the arm 52 into position over the mated edges of the compression section and actuates another switch which releases air into the air chamber 55, thus expanding the air bag 54 until it provides a firm contact against the edges of the material using the paten as a backing, thus acting as a means for splicing the skived edges. The splice will occur between the skived edges because of the self-adhesion properties of the uncured compression stock. The arm 52 is then swung out of the way and then the completed compression section, which is designated by reference numeral 89, is ready for the next step. By swinging the tapered arm 56 into alignment with the drum 58, the operator can easily slide the section 89 directly onto the building drum which is in a contracted position. The arm is swung out of the way. The tailstock mechanism is then actuated, which sequentially operates pistons 91 and 90, which causes the tailstock 60 to first slide at right angles to the axis of the drum until it is in alignment and then automatically slides the entire tailstock and track 61 toward the end of the shaft 59 until the section 89 can be slid on the shaft by the operator for further operations. Actuation of another mechanism, such as described in U.S. Patent No. 2,661,579, will then expand the drum until the compression section firmly embraces the drum.

The next step in the operation consists of laying the cord 76 in its helical path around the compression section. The operator first runs the collar 87 toward the tailstock end of the building drum 58 where it automatically stops in position to begin laying the cord from that end. The cord itself has been dipped into an adhesive, thus providing a sticky coating which permits the cord to adhere to the member 89. The operator first lays the free end of the cord against the compression section and actuates the mechanism which proceeds to lay the cord from left to right as shown in FIGURE 1 along the drum in a helical path. The collars 74 and 87 rotate clockwise as shown in FIGURE 3, while at the same time the shaft 59 and drum 58 rotate counterclockwise thus providing a counter rotation, resulting in a greater speed in laying the cord than if the cord feed did not rotate. This step alone represents a great advance over prior art devices in which only the drum could rotate, since it also provides a greater control. The entire reservoir or container 73, together with its cord supply, rotates with the collars and the cord is thus smoothly and evenly applied around the compression section. When the collar 87 has reached the proper position on the right or driving end of the drum, it is automatically stopped. The tension brake 82 and the pulley system provide proper cord tension, and if desired a clutching arrangement could also affect the tension in the cord.

The operator then cuts the cord and is ready to apply the tension stock 72 which he does by simply actuating the drive-out roll 71 and pulling the stock down until he has obtained the desired amount. This tension stock is then wrapped around the drum and is cut off the roll, while the separating fabric 97 is separately reeled up.

In order to insure a good bond of all three components of this member, it is necessary to apply a peripheral pressure against the assembly. This is accomplished by actuating the piston 92 which slides the structural member 95 to the right, at the same time moving cutting cylinder 63 and pressure roller 66 from the solid line position of FIGURE 4 to the right. The pressure roller is then below and slightly to the left of the drum 58 and actuation of arm 93 and rocker shaft 69 will rotate arm 68, shaft 67, and roller 66 to the position shown in phantom in FIGURE 4, with the roller contacting the outer surface of the drum 58. By rotating the drum and by virtue of the fact that the pressure roller is free to rotate on shaft 67, peripheral pressure is evenly applied and the soft rubber material of the compression section and the tension stock and cord are forced together to provide a temporary bond.

The next step in the process involves the cutting of the belt sleeve into separate belt bodies. The pressure roller is returned to its downward position and piston 92 is again actuated to drive the cutting cylinder 63 gradually toward the drum. At the same time the motor 98 is actuated to rotate the cutting cylinder in a direction opposite the direction or rotation of the drum. In other words, the drum continues to rotate in a counterclockwise direction while the cutting cylinder rotates in a clockwise direction. The cutting knives 64 will gradually cut into the belt sleeve on the drum, and thus separate the belt sleeve into the belt bodies. The exact nature of the cutting operation will not be described more fully as it is not an essential part of the present invention.

Figure 7:
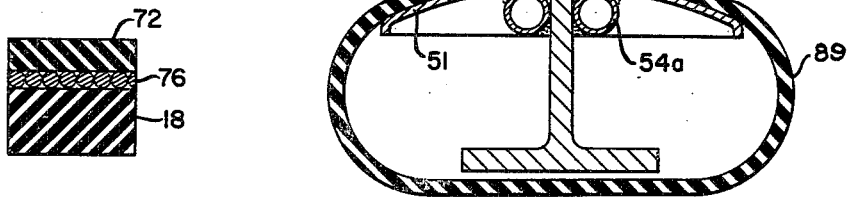
FIGURE 7 is a section of a completed belt body.

When the cutting operation is completed the cutting cylinder is returned to its original position, the tailstock is removed from its supporting position, and the drum is again contracted. This allows the belt sleeve to be removed from the drum. The individual belt bodies have sufficient cohesion to remain together during the removal and they are then separated from each other by simply pulling them apart. A cross-section of a typical belt body is illustrated in FIGURE 7. The bodies are then ready for the final molding step that will form complete V-belts.

Of course, it is understood that while certain steps of this process are occurring, the operator is capable of performing other steps. Thus, the present apparatus lends itself to economy of operation because it automatically performs certain steps of this operation while leaving the operator free to initiate other steps. As a result, the essential steps of feeding the compression section, cutting it to length, forming it into an annular member, applying a cord, wrapping it with a tension section, forcing the sections together, and cutting the thus completed belt sleeve into separate bodies is accomplished automatically with the operator only being required to initiate certain of these steps. It can be readily seen that by use of this mechanism, economy of operation is practiced to a degree never before possible. It is understood, of course, that the spirit of the invention may be maintained while modifying certain features which have been disclosed.

We claim:

1. In the manufacture of an endless belt body, the steps of forming a compression section, placing said section on a supporting drum, and rotating said drum while simultaneously laying a cord on said drum in an opposite direction.

2. In the method of claim 1, the further steps of applying a tension section on said cord, applying pressure to the outer surface of said tension section to form a belt sleeve, and cutting said sleeve to provide a plurality of belt bodies.

3. In an apparatus for manufacturing endless belt bodies including a compression section, a rotatable drum upon which said section is placed, means mounted internally of said drum to expand it to a desired diameter, supporting means for one end of said drum, and means for moving said supporting means in two different directions to permit mounting of said section on said drum.

References Cited by the Examiner

UNITED STATES PATENTS

| | | | |
|---|---|---|---|
| 1,708,129 | 4/29 | Gammeter | 156—193 XR |
| 1,969,067 | 8/34 | Freeman | 154—4 |
| 1,974,629 | 9/34 | Roberts | 156—285 XR |
| 2,019,361 | 10/35 | Roberts | 156—285 XR |
| 2,367,821 | 1/45 | Davis | 154—3 |
| 2,456,580 | 12/48 | Carter et al. | 156—193 XR |
| 2,503,882 | 4/50 | Medford | 154—116 XR |
| 2,510,553 | 6/50 | Carter et al. | 154—3 |
| 2,540,201 | 2/51 | Haren | 154—3 |
| 2,615,491 | 10/52 | Harris et al. | |
| 2,628,505 | 2/53 | Riel et al. | 154—3 XR |
| 2,688,996 | 9/54 | Loomis | 154—116 |
| 2,723,426 | 11/55 | Pelley. | |
| 2,861,405 | 11/58 | Hanford. | |

EARL M. BERGERT, *Primary Examiner.*

ALEXANDER WYMAN, CARL F. KRAFFT,
*Examiners.*